(12) United States Patent
Ho et al.

(10) Patent No.: US 11,693,479 B2
(45) Date of Patent: Jul. 4, 2023

(54) VIRTUAL IMAGE DISPLAY DEVICE AND OBJECT SELECTION METHOD FOR VIRTUAL IMAGE THEREOF

(71) Applicant: HTC Corporation, Taoyuan (TW)

(72) Inventors: Chia-Chu Ho, Taoyuan (TW); Ching-Hao Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/574,547

(22) Filed: Jan. 13, 2022

(65) Prior Publication Data
US 2023/0107586 A1 Apr. 6, 2023

Related U.S. Application Data

(60) Provisional application No. 63/249,543, filed on Sep. 28, 2021.

(51) Int. Cl.
*G06F 3/01* (2006.01)
*G06F 3/04842* (2022.01)
*G06F 3/0346* (2013.01)

(52) U.S. Cl.
CPC .............. *G06F 3/014* (2013.01); *G06F 3/011* (2013.01); *G06F 3/0346* (2013.01); *G06F 3/04842* (2013.01); *G06F 2203/0331* (2013.01)

(58) Field of Classification Search
CPC ........... G06F 3/011–017; G06F 3/0346; G06F 3/04842; G06F 1/163; G06F 2203/0331
See application file for complete search history.

(56) References Cited

U.S. PATENT DOCUMENTS

| | | | | |
|---|---|---|---|---|
| 10,359,862 | B2 * | 7/2019 | Moon | G06F 3/017 |
| 10,401,957 | B2 * | 9/2019 | Lee | G06F 3/011 |
| 10,416,755 | B1 * | 9/2019 | Erivantcev | G06F 3/017 |
| 10,853,991 | B1 * | 12/2020 | Yan | G06F 3/011 |
| 10,928,975 | B2 * | 2/2021 | Wang | G06F 1/1694 |
| 11,175,729 | B2 * | 11/2021 | Erivantcev | G06F 3/0304 |
| 11,320,896 | B2 * | 5/2022 | Yu | G06V 40/28 |
| 11,353,967 | B2 * | 6/2022 | Martin | G06F 3/03547 |
| 11,397,478 | B1 * | 7/2022 | Gutierrez | G06F 3/038 |
| 2015/0258432 | A1 | 9/2015 | Stafford et al. | |

(Continued)

OTHER PUBLICATIONS

"Office Action of Taiwan Counterpart Application", dated Jan. 4, 2023, p. 1-p. 6.

*Primary Examiner* — Patrick F Marinelli
(74) *Attorney, Agent, or Firm* — JCIPRNET

(57) ABSTRACT

A virtual image display device and an object selection method for virtual image thereof are provided. The object selection method for virtual image includes the following: a virtual image display is enabled to capture image information of a hand of a user; whether an image of an auxiliary tool is present in the image information is determined; position information of the auxiliary tool is generated according to the image of the auxiliary tool when the image of the auxiliary tool is present in the image information; the virtual image display is enabled to generate the position information of the auxiliary tool according to inertial measurement information of the auxiliary tool when the image of the auxiliary tool is not present in the image information; and the virtual image display is enabled to display an auxiliary indicator for selecting object according to the position information.

8 Claims, 4 Drawing Sheets

(56) References Cited

U.S. PATENT DOCUMENTS

| | | | |
|---|---|---|---|
| 2016/0018879 A1* | 1/2016 | Hsiao | H04W 52/0277 |
| | | | 713/320 |
| 2018/0246565 A1* | 8/2018 | Moon | G06F 3/016 |
| 2018/0292899 A1* | 10/2018 | Lee | G06T 19/20 |
| 2019/0279428 A1 | 9/2019 | Mack et al. | |
| 2020/0372702 A1* | 11/2020 | Yan | G06F 3/0346 |
| 2020/0394012 A1* | 12/2020 | Wright, Jr. | G02B 27/0101 |
| 2021/0011560 A1* | 1/2021 | Park | G06F 3/017 |
| 2021/0019036 A1* | 1/2021 | Wang | G06F 3/0346 |
| 2021/0089116 A1* | 3/2021 | Erivantcev | G06T 7/70 |
| 2021/0208698 A1* | 7/2021 | Martin | G06F 3/012 |
| 2022/0035441 A1* | 2/2022 | Yu | G06F 3/017 |
| 2022/0221946 A1* | 7/2022 | Hsueh | G06F 3/0346 |

* cited by examiner

VIRTUAL IMAGE DISPLAY DEVICE AND OBJECT SELECTION METHOD FOR VIRTUAL IMAGE THEREOF

CROSS-REFERENCE TO RELATED APPLICATION

This application claims the priority benefit of U.S. provisional application Ser. No. 63/249,543, filed on Sep. 28, 2021. The entirety of the above-mentioned patent application is hereby incorporated by reference herein and made a part of this specification.

BACKGROUND

Technical Field

The disclosure relates to a virtual image display device and an object selection method for virtual image, in particular to a virtual image display device providing an auxiliary tool and an object selection method for virtual image by means of the auxiliary tool.

Description of Related Art

With the advancement of electronic technology, virtual image displays that allow for virtual reality and augmented reality are becoming more and more mainstream. In today's technology, to enhance the user's experience in the virtual image world, it can also be paired with the user's accessories to provide a mechanism for the user to interact with the images of objects displayed in the virtual world.

In particular, when the user selects an object in the virtual environment, the human body is accustomed to use the index finger to point to the object to make the selection as a direct response. However, such an action may cause the hand to obscure the user's worn accessories, and the object pointing and selection action cannot be performed effectively. As a result, a conventional virtual image display device may limit the user to apply specific but uncomfortable movements for object selection, reducing the user's comfort and experience in the virtual reality experience.

SUMMARY

The disclosure provides a virtual image display device and an object selection method for virtual image, capable of effectively enhancing a user's experience.

The object selection method for virtual image of the disclosure includes the following: a virtual image display is enabled to capture image information of a hand of a user; whether an image of an auxiliary tool is present in the image information is determined; position information of the auxiliary tool is generated according to the image of the auxiliary tool when the image of the auxiliary tool is present in the image information; the virtual image display is enabled to generate the position information of the auxiliary tool according to inertial measurement information of the auxiliary tool when the image of the auxiliary tool is not present in the image information; and the virtual image display is enabled to display an auxiliary indicator for selecting an object according to the position information.

The virtual image display device of the disclosure includes a virtual image display and an auxiliary tool. The auxiliary tool is electrically coupled to the virtual image display. The virtual image display is configured to: capture image information of a hand of a user; determine whether an image of the auxiliary tool is present in the image information; generate position information of the auxiliary tool according to the image of the auxiliary tool when the image of the auxiliary tool is present in the image information; generate the position information of the auxiliary tool according to inertial measurement information of the auxiliary tool when the image of the auxiliary tool is not present in the image information; and display an auxiliary indicator for selecting an object according to the position information.

Based on the above, the virtual image display of the disclosure displays the auxiliary indicator for selecting the object by capturing the image of the auxiliary tool, and displays the auxiliary indicator for selecting the object according to the inertial measurement information of the auxiliary tool when the image of the auxiliary tool is not available. In this way, the user may perform a selection action on a virtual object without the restriction of selection pose, which may effectively enhance the experience of virtual reality images.

DESCRIPTION OF THE EMBODIMENTS

Figure 1:
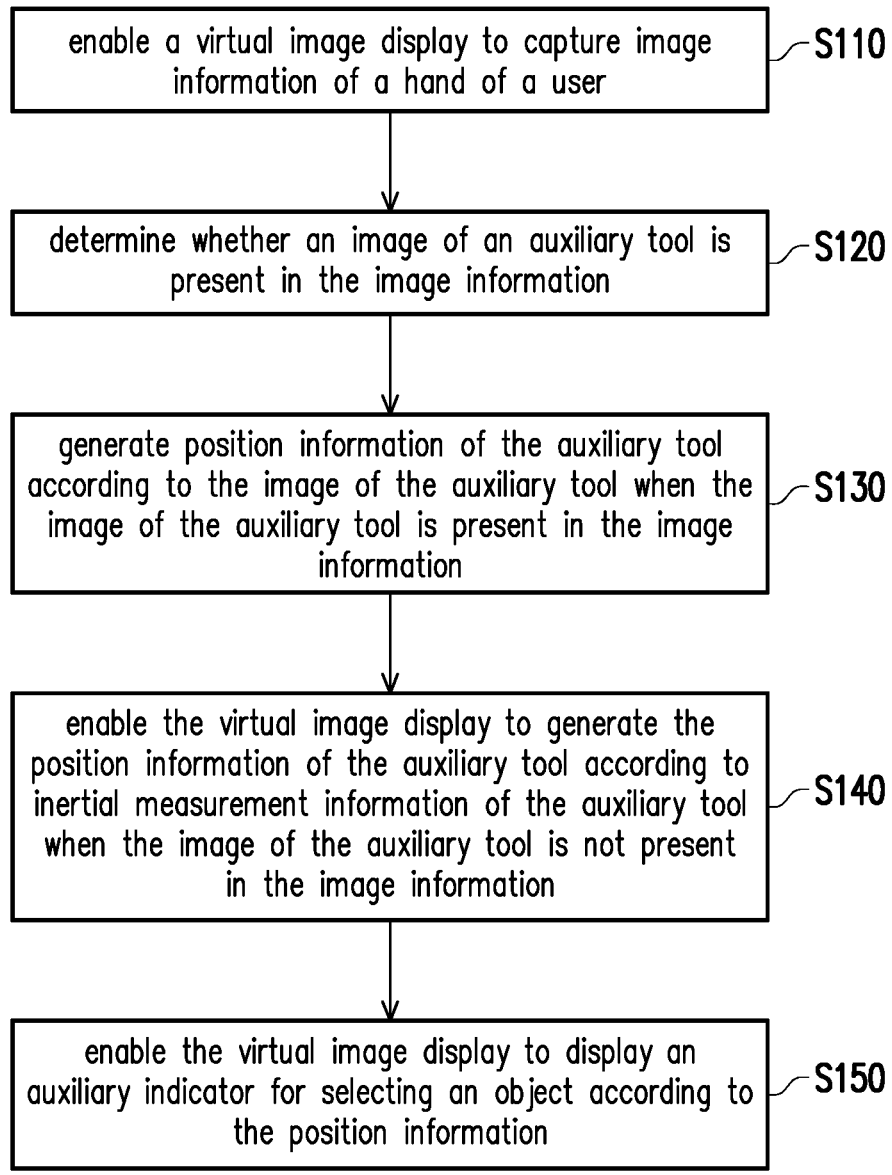
FIG. 1 is a flowchart illustrating an object selection method for virtual image according to an embodiment of the disclosure.

Referring to FIG. 1, FIG. 1 is a flowchart illustrating an object selection method for virtual image according to an embodiment of the disclosure. The object selection method for virtual image according to this embodiment is applicable to virtual display devices, such as head-mounted display devices for generating virtual reality or augmented reality. In step S110, a virtual image display is enabled to capture image information of a hand of a user. Also, in step S120, whether an image of an auxiliary tool is present in the image information is determined. Here, the auxiliary tool may be worn on the hand of the user and used as an auxiliary prop for the user to perform a selection action on a virtual object. According to this embodiment, the auxiliary tool may be a ring and be worn on the user's finger.

In step S130, according to the determination action of step S120, the virtual image display is enabled to generate position information of the auxiliary tool according to the image of the auxiliary tool when the image of the auxiliary tool is present in the image information. In contrast, in step S140, the virtual image display is enabled to generate the position information of the auxiliary tool according to inertial measurement information of the auxiliary tool when the image of the auxiliary tool is not present in the image information. Also, in step S150, the virtual image display is enabled to display an auxiliary indicator for selecting an object according to the position information. According to this embodiment, the auxiliary indicator may be a beam emitted by the auxiliary tool worn on the hand of the user to provide the user with a beam to point to a selected virtual object and to perform the selection action on the virtual object.

Figure 2A:
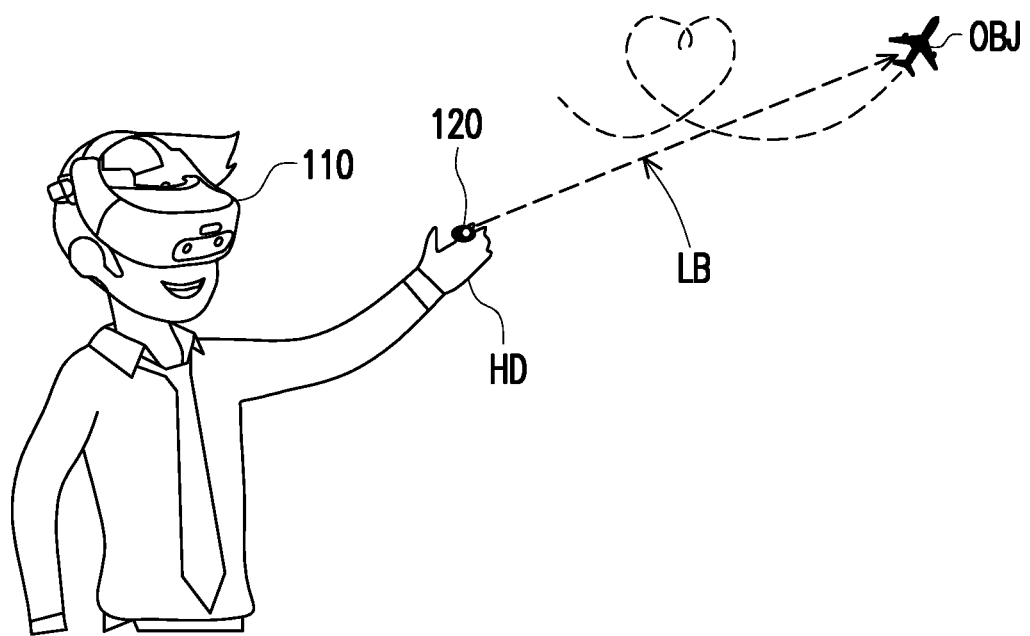
FIG. 2A to FIG. 2C are schematic diagrams illustrating implementation of an object selection action according to embodiments of the disclosure.

Referring to FIG. 1 and FIG. 2A to FIG. 2C, FIG. 2A to FIG. 2C are schematic diagrams illustrating implementation of an object selection action according to embodiments of the disclosure. In FIG. 2A, corresponding to step S110 to step S130, the user wears a virtual image display device 110 as a head-mounted display, and captures image information of a hand HD through the virtual image display device 110. In addition, the virtual image display device 110 generates position information of an auxiliary tool 120 by analyzing the image information of the hand HD according to an image of the auxiliary tool 120 on the image information of the hand HD. Further, corresponding to step S150, the virtual image display device 110 may display an auxiliary indicator LB for selecting an object OBJ according to the position information of the auxiliary tool 120. The object OBJ may be a virtual object in the virtual image.

Figure 2B:
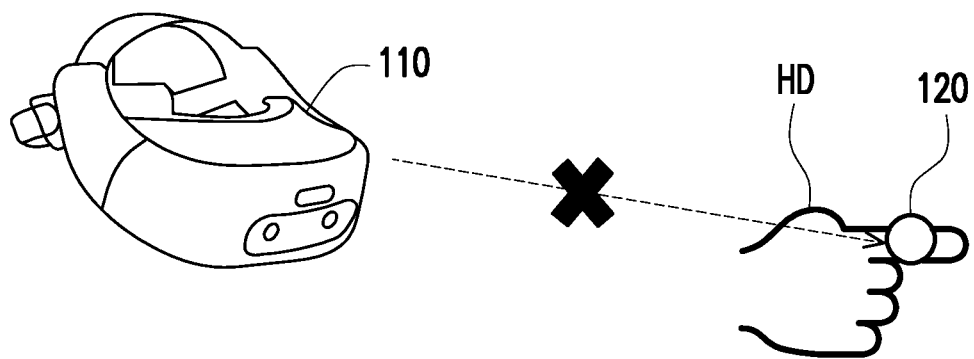
Figure 2C:
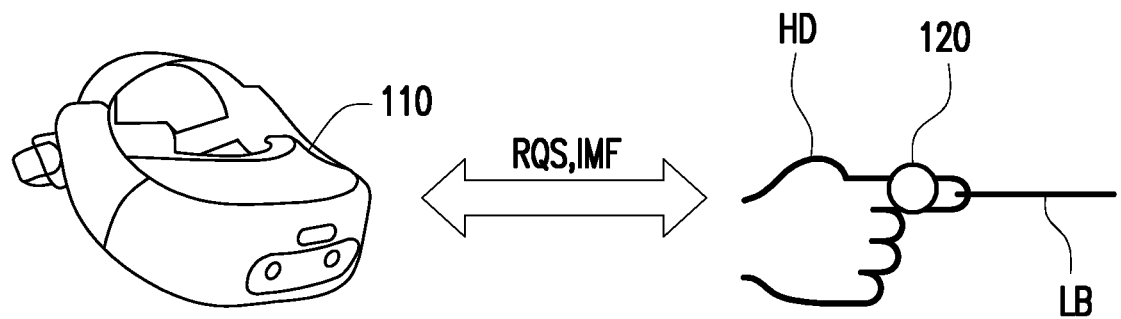

Next, referring to FIG. 2B, when the hand HD (e.g. palm or first) of the user blocks the auxiliary tool 120 due to a change in the user's hand posture, and the virtual image display 110 cannot capture the image of the auxiliary tool 120, i.e., the image of the hand HD of the user captured by the image display 110 cannot be determined to contain the image of the auxiliary tool 120, the virtual image display 110 may send a demand signal RQS to the auxiliary tool 120 as shown in FIG. 2C. At this time, when the auxiliary tool 120 receives the demand signal RQS, the auxiliary tool 120 may activate an internal inertial measurement unit (IMU) to perform an inertial measurement action, and transfer inertial measurement information IMF generated during the inertial measurement action to the virtual image display 110. In this way, the virtual image display device 110 may estimate the position information of the auxiliary tool 120 on the hand HD of the user according to the inertial measurement information IMF, and further display the auxiliary indicator LB according to the obtained position information. The user may then apply the auxiliary indicator LB to point to a desired object and perform an object selection action.

That is to say, according to this embodiment of the disclosure, the user may effectively perform the object selection action without being restricted by posture. Thus, the user may, for example, use an index finger to point to the selected object to perform the object selection action under the premise of the human body's habitual movement, effectively enhancing the experience in the virtual reality (or augmented reality) environment.

According to this embodiment, the virtual image display device 110 may continuously detect whether the image of the auxiliary tool 120 can be effectively interpreted in the image of the hand HD of the user. Once the image of the hand HD of the user has a valid image of the auxiliary tool 120, the virtual image display 110 may stop sending the demand signal RQS and cause the auxiliary tool 120 to stop performing the inertial measurement action to save unnecessary power consumption.

Figure 3:
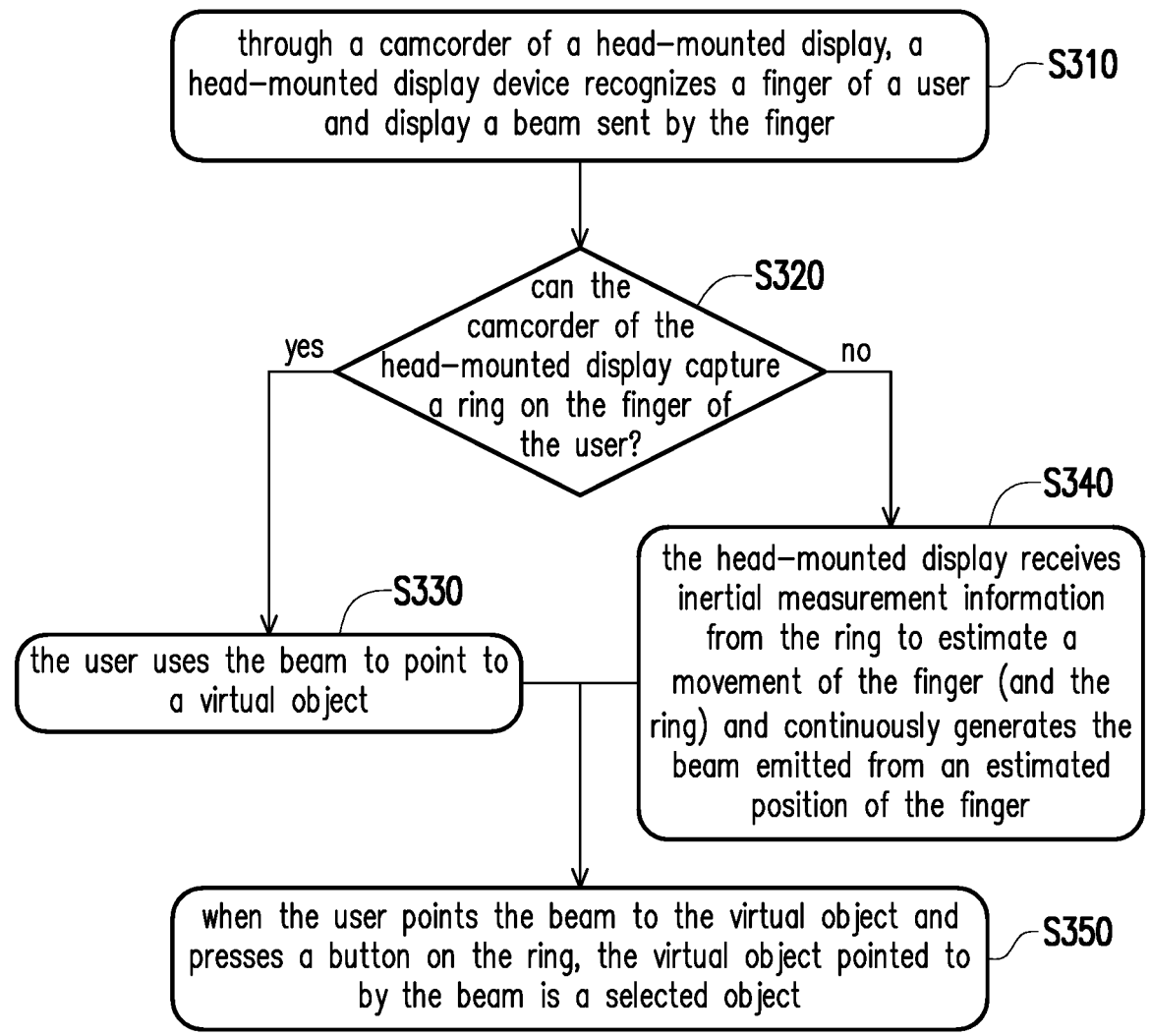
FIG. 3 is a flowchart illustrating an object selection action for virtual image according to an embodiment of the disclosure.

Referring to FIG. 3, FIG. 3 is a flowchart illustrating an object selection action for virtual image according to an embodiment of the disclosure. In step S310, through a camcorder (e.g., a camera) of the head-mounted display (the virtual image display device), the head-mounted display device may recognize a position of a finger of the user and display a beam (the auxiliary indicator) sent by the finger. The head-mounted display may determine the position of the finger of the user according to an image of the finger of the user captured by the camcorder. In step S320, the head-mounted display is used to determine whether its camcorder can capture the ring on the finger of the user. When the camcorder of the head-mounted display can capture the ring on the finger of the user, step S330 can be performed. In step S330, the head-mounted display may continuously display the beam sent by the finger, and provide the user with the beam to point to a virtual object. In contrast, if a determination result of step S320 is no, step S340 can be performed. In step S340, the head-mounted display may receive the inertial measurement information from the ring to estimate a movement of the finger (and the ring) and continuously generate the beam emitted from an estimated position of the finger.

In step S350, when the user points the beam to the virtual object and presses a button on the ring, the virtual object pointed to by the beam is a selected object.

Figure 4:
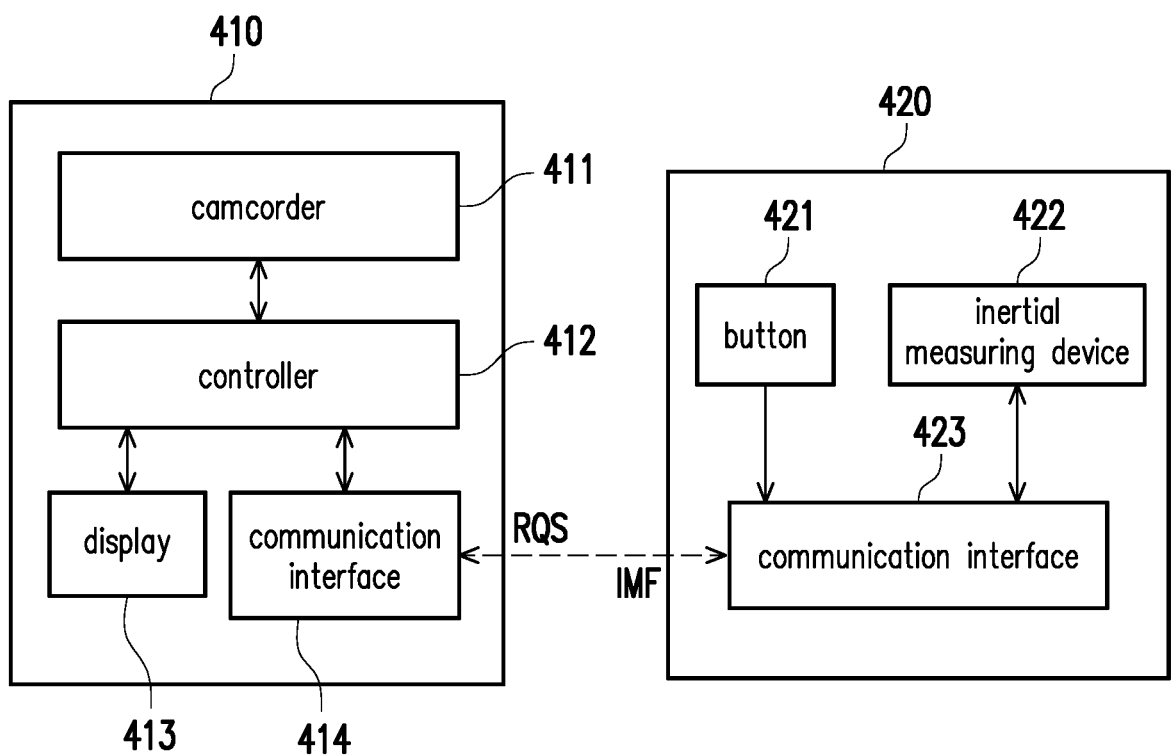
FIG. 4 is a schematic diagram of a virtual image display device according to an embodiment of the disclosure.

Referring to FIG. 4, FIG. 4 is a schematic diagram of a virtual image display device according to an embodiment of the disclosure. A virtual image display device 400 includes a virtual image display 410 and an auxiliary tool 420. The virtual image display 410 and the auxiliary tool 420 are electrically coupled to each other. The virtual image display 410 includes a camcorder 411, a controller 412, a display 413, and a communication interface 414. The auxiliary tool 420 includes a button 421, an inertial measuring device 422, and a communication interface 423. The camcorder 411 may be configured to capture motion images or still images.

According to this embodiment, the camcorder 411 is configured to capture the image information of the hand of the user. The controller 412 may analyze the image information of the hand of the user and determine whether the image of the auxiliary tool is present in the image information. Moreover, the controller 412 may generate the position information of the auxiliary tool according to the image of the auxiliary tool when the image of the auxiliary tool is present in the image information. Next, the controller 412 may drive the display 413 to display an auxiliary indicator at a position corresponding to the auxiliary tool according to the position information.

On the other hand, when the controller 412 determines that the image of the auxiliary tool is not present in the image information, then the demand signal RQS may be sent through a communication interface 414. The auxiliary tool 420 may receive the demand signal RQS through a communication interface 423. In addition, the auxiliary tool 420 may activate the inertial measurement device 422 according to the demand signal RQS to perform the inertial measurement action, and transfer the inertial measurement information IMF obtained by the inertial measurement action to the virtual image display 410 through the communication interface 423.

The virtual image display 410 may receive the inertial measurement information IMF through the communication interface 414. The controller 412 may estimate the position information of the auxiliary tool according to the inertial measurement information IMF, and may drive the display 413 to display an auxiliary indicator at the position corresponding to the auxiliary tool according to the estimated position information.

On the other hand, the button 421 on the auxiliary tool 420 may serve as a medium for sending a command signal. According to this embodiment, when the user decides on the object to be selected, the user may send a command signal to the virtual image display 410 by pressing the button 421. The controller 412 of the virtual image display 410 may perform the selection action on a corresponding object according to the command signal and the position of the auxiliary indicator.

Regarding the details of the hardware architecture, the display 413 may be any form of display without any special restrictions. The communication interfaces 414 and 423 may be wired or wireless signal transmission interface circuits in any format. The inertial measurement device 422 may be any form of inertial measurement unit sensor known to those skilled in the art. In addition, the controller 412 may be a processor with computing capabilities. Alternatively, the controller 412 may be a hardware circuit designed by means of a hardware description language (HDL) or any other digital circuit design method well known to those skilled in the art, and implemented by means of a field programmable gate array (FPGA), Complex Programmable Logic Device (CPLD) or Application-specific Integrated Circuit (ASIC).

In summary, the virtual image display of the disclosure uses the determination of whether the auxiliary tool on the hand of the user can be effectively captured to obtain the position information of the auxiliary tool according to the image of the auxiliary tool, or the position information of the auxiliary tool according to the inertial measurement information transferred by the auxiliary tool. Further, the virtual image display may display the auxiliary indicator according to the position information of the auxiliary tool, which may be used as a basis for object selection by the user. In this way, the virtual image display does not restrict the user's movements during object selection, which enhances the comfort and experience of the user's movements in the virtual environment.

What is claimed is:

1. An object selection method for virtual image, comprising:
    enabling a virtual image display to capture image information of a hand of a user;
    determining whether an image of an auxiliary tool is present in the image information;
    generating position information of the auxiliary tool according to the image of the auxiliary tool when the image of the auxiliary tool is present in the image information;
    enabling the virtual image display to generate the position information of the auxiliary tool according to inertial measurement information of the auxiliary tool when the image of the auxiliary tool is not present in the image information; and
    enabling the virtual image display to display an auxiliary indicator for selecting an object according to the position information;
    wherein, when the image of the auxiliary tool is not present in the image information:
        enabling the virtual image display to continuously send a demand signal to the auxiliary tool; and
        enabling the auxiliary tool to initiate an inertial measurement action according to the demand signal and to generate the inertial measurement information
    wherein, when the image of the auxiliary tool is present in the image information:
        enabling the virtual image display to stop sending the demand signal to the auxiliary tool; and
        enabling the auxiliary tool to stop performing the inertial measurement action.

2. The object selection method for virtual image according to claim 1, wherein enabling the virtual image display to display the auxiliary indicator for selecting the object according to the position information comprises:
    enabling the virtual image display to display the auxiliary indicator in a virtual image at a position corresponding to the hand of the user.

3. The object selection method for virtual image according to claim 1 further comprising:
    enabling the auxiliary tool to send a selection command to the virtual image display; and
    enabling the virtual image display to perform a selection action on a virtual object image pointed to by the auxiliary indicator according to the selection command.

4. A virtual image display device, comprising:
    a virtual image display; and
    an auxiliary tool electrically coupled to the virtual image display,
    wherein the virtual image display is configured to:
        capture image information of a hand of a user;
        determine whether an image of the auxiliary tool is present in the image information;
        generate position information of the auxiliary tool according to the image of the auxiliary tool when the image of the auxiliary tool is present in the image information;
        generate the position information of the auxiliary tool according to inertial measurement information of the auxiliary tool when the image of the auxiliary tool is not present in the image information; and
        display an auxiliary indicator for selecting an object according to the position information;
    wherein when the image of the auxiliary tool is not present in the image information, the virtual image display continuously sends a demand signal to the auxiliary tool, and the auxiliary tool initiates an inertial measurement action according to the demand signal and generates the inertial measurement information;
    wherein when the image of the auxiliary tool is present in the image information, the virtual image display stops sending the demand signal to the auxiliary tool, and the auxiliary tool stops performing the inertial measurement action.

5. The virtual image display device according to claim 4, wherein the auxiliary tool comprises:
    a button configured to generate a selection command,
    wherein the auxiliary tool sends the selection command to the virtual image display, and the virtual image display performs a selection action on a virtual object image pointed to by the auxiliary indicator according to the selection command.

6. The virtual image display device according to claim 5, wherein the auxiliary tool further comprises:
    an inertial measurement device activated according to the demand signal to generate the inertial measurement information; and
    a communication interface configured to transfer information with the virtual image display.

7. The virtual image display device according to claim 4, wherein the virtual image display displays the auxiliary indicator in a virtual image at a position corresponding to the hand of the user.

8. The virtual image display device according to claim 4, wherein the virtual image display comprises:
    a camcorder configured to capture the image information of the hand of the user;
    a controller coupled to the camcorder to generate the position information;
    a display coupled to the controller to display the auxiliary indicator; and
    a communication interface coupled to the controller to transfer information with the auxiliary tool.

* * * * *